(12) United States Patent
Yen et al.

(10) Patent No.: US 10,240,940 B2
(45) Date of Patent: Mar. 26, 2019

(54) ROUTE PLANNING SYSTEM AND METHOD

(71) Applicant: Chiun Mai Communication Systems, Inc., New Taipei (TW)

(72) Inventors: Hsiu-Hua Yen, New Taipei (TW); Chih-Pu Hsu, New Taipei (TW); Chia-Wei Chien, New Taipei (TW); Sung-Chieh Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/393,282

(22) Filed: Dec. 29, 2016

(65) Prior Publication Data

US 2017/0284821 A1 Oct. 5, 2017

(30) Foreign Application Priority Data

Mar. 29, 2016 (TW) .............................. 105109777 A

(51) Int. Cl.
*G01C 21/36* (2006.01)
*G01C 21/34* (2006.01)
*H04L 29/08* (2006.01)

(52) U.S. Cl.
CPC ..... *G01C 21/3614* (2013.01); *G01C 21/3415* (2013.01); *G01C 21/3602* (2013.01); *G01C 21/362* (2013.01); *G01C 21/3623* (2013.01); *G01C 21/3647* (2013.01); *G01C 21/3691* (2013.01); *H04L 67/18* (2013.01); *G01C 21/343* (2013.01)

(58) Field of Classification Search
CPC .............. G01C 21/3602; G01C 21/362; G01C 21/3623; G01C 21/3647; G01C 21/3691; G01C 21/3614; G01C 21/3415; H04L 67/18
See application file for complete search history.

(56) References Cited

U.S. PATENT DOCUMENTS

| | | | | |
|---|---|---|---|---|
| 8,175,340 | B2 * | 5/2012 | Tsutsui | G01C 21/20 382/113 |
| 8,285,483 | B2 * | 12/2012 | Amer-Yahia et al. | G01C 21/343 701/428 |
| 8,407,225 | B2 * | 3/2013 | Lahcanski et al. | G06F 17/30241 707/738 |
| 8,532,927 | B2 * | 9/2013 | Joshi et al. | G01C 21/3461 701/537 |
| 9,127,957 | B2 | 9/2015 | Smith | |
| 2006/0089792 | A1 | 4/2006 | Manber et al. | |

(Continued)

*Primary Examiner* — Dale W Hilgendorf
(74) *Attorney, Agent, or Firm* — ScienBiziP, P.C.

(57) ABSTRACT

A route planning system applied in a server or in a mobile client device can plan a travel route according to client device location information. The route planning system includes an obtaining module, a selection module, and a calculation module. The obtaining module obtains the client device location information. The selection module determines a distance or scanning range according to the client device location information, and selects first pictures from the server or the client device of destinations or attractions which are within the scanning range, according to the location information of all the stored pictures. The calculation module calculates at least one route according to the location information of the first pictures. A route planning method is also provided.

13 Claims, 5 Drawing Sheets

(56) References Cited

U.S. PATENT DOCUMENTS

| | | |
|---|---|---|
| 2007/0168118 A1 | 7/2007 | Lappe et al. |
| 2009/0279794 A1* | 11/2009 | Brucher ............ G06F 17/30241 382/225 |
| 2010/0305844 A1 | 12/2010 | Choi et al. |
| 2011/0150452 A1* | 6/2011 | Toda .................. G01C 21/3602 701/408 |
| 2013/0332068 A1* | 12/2013 | Kesar et al. ....... G01C 21/3614 701/430 |
| 2015/0051835 A1 | 2/2015 | Jung et al. |

* cited by examiner

ROUTE PLANNING SYSTEM AND METHOD

FIELD

The subject matter herein generally relates to a route planning system and method.

BACKGROUND

When a user arranges a travel schedule, the user may select the tourist spots and arrange the schedule by the user according to data. Arranging the travel schedule may cost much time. The user also may spend much travel time in traffic as a result.

BRIEF DESCRIPTION OF THE DRAWINGS

Implementations of the present technology will now be described, by way of example only, with reference to the attached figures.

DETAILED DESCRIPTION

Figure 1:
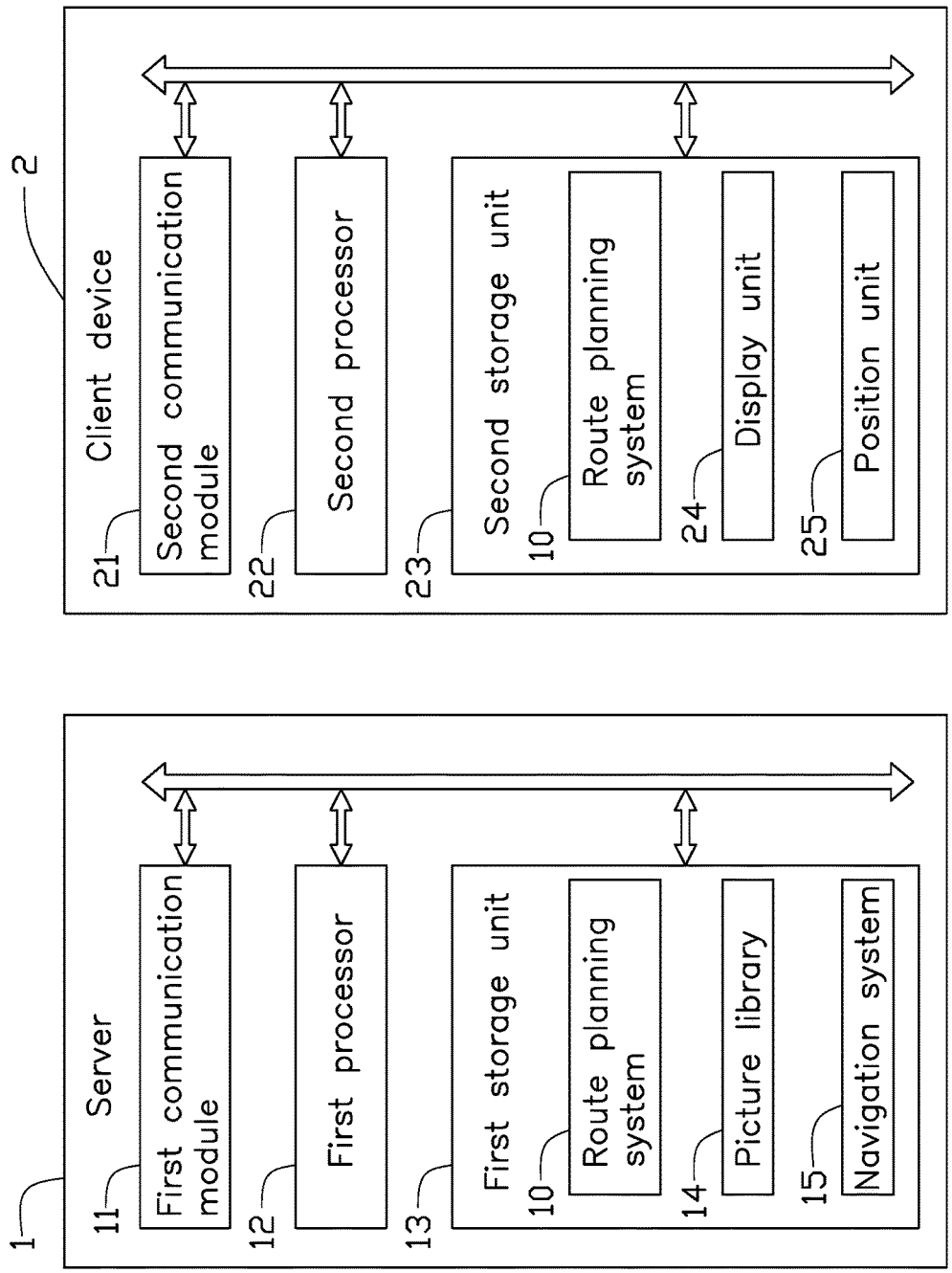
FIG. 1 is a diagram of an exemplary embodiment of a route planning system.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure. It should be noted that references to "an" or "one" exemplary embodiment in this disclosure are not necessarily to the same exemplary embodiment, and such references mean "at least one."

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a route planning system 10. The route planning system 10 can be operated in a server 1 or a client device 2. When the route planning system 10 operates in the server 1, the route planning system 10 can communicate with the client device 2 through a wireless network.

The server 1 comprises a first communication module 11, the client device 2 comprises a second communication module 21. The server 1 can communicate with the client device 2 through the first communication module 11 and the second communication module 21. The server 1 also can communicate with a plurality of client devices.

In one exemplary embodiment, the first communication module 11 and the second communication module 21 can be a 3G network module, a 4G network module, or a wireless card module. The first communication module 11 and the second communication module 21 can access the internet.

In one exemplary embodiment, the client device 2 can be a computer, a mobile phone, a smart watch, or a vehicle navigator.

The server 1 further comprises a first processor 12, a first storage unit 13, a picture library 14, and a navigation system 15. The client device 2 further comprises a second processor 22, a second storage unit 23, a display unit 24, and a position unit 25.

The first storage unit 13 and the second storage unit 23 can be configured to store a plurality of modules, that is a collection of digital instructions run in the server 1 and the client device 2. The first processor 12 and the second processor 22 can be configured to execute the plurality of modules.

In one exemplary embodiment, the first storage unit 13 and the second storage unit 23 can be a smart media card, a flash card, a hard disk, or a redundant array of inexpensive disks.

In one exemplary embodiment, the picture library 14 can be stored in the first storage unit 13. When the plurality of client devices 2 is connected to the server 1 through the wireless network, one or more library pictures are stored by the plurality of client devices 2 through the wireless network.

In one exemplary embodiment, the picture library 14 can be stored in the second storage unit 23. The picture library 14 can be a picture album of the client device 2.

In one exemplary embodiment, the picture library 14 can be stored in a file server (not shown). The server 1 or the client device 2 can communicate with the file server, to store or retrieve pictures from the file server.

Pictures of the picture library 14 comprise exchangeable image file format (EXIF) information. The EXIF information comprises location information of pictures, time information of pictures, and filming equipment information of pictures.

In one exemplary embodiment, the navigation system 15 can be stored in the first storage unit 13. The navigation system 15 is configured to calculate a route from a starting location to a destination location and navigate to the destination location.

In one exemplary embodiment, the navigation system 15 can be stored in the second storage unit 23 or the file server.

The display unit 24 can be configured to display a picture, a route, or other information. The display unit 24 can be a touch screen. The display unit 24 is further configured to receive user input. The position unit 25 is configured to obtain client device location information or a client device moving direction. The position unit 25 can be a global position system (GPS) module.

The route planning system 10 is configured to obtain the client device location information and determine a scanning range according to the client device location information, and select first pictures from the picture library 14 within the scanning range according to location information of first pictures to plan one or more routes.

Figure 2:
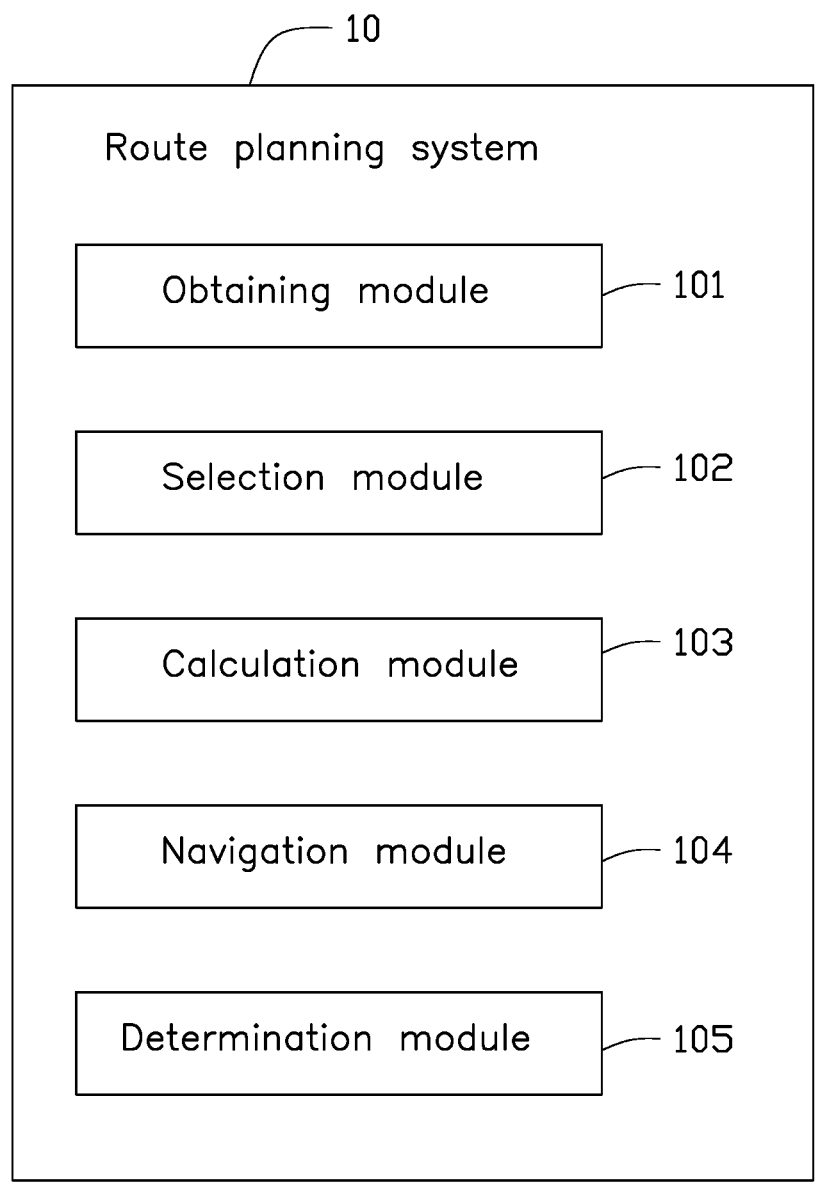
FIG. 2 is a block diagram of an exemplary embodiment of the route planning system.

Referring to FIG. 2, the route planning system 10 comprises an obtaining module 101, a selection module 102, a calculation module 103, a navigation module 104, and a determination module 105. The obtaining module 101, the selection module 102, the calculation module 103, the navigation module 104, and the determination module 105 can be operated in the server 1.

In one exemplary embodiment, the navigation module 104 is operated in the client device 2, and the obtaining module 101, the selection module 102, the calculation module 103, and the determination module 105 are operated in the server 1.

In one exemplary embodiment, the obtaining module 101, the selection module 102, the calculation module 103, the navigation module 104, and the determination module 105 can be operated in the client device 2.

Figure 3:
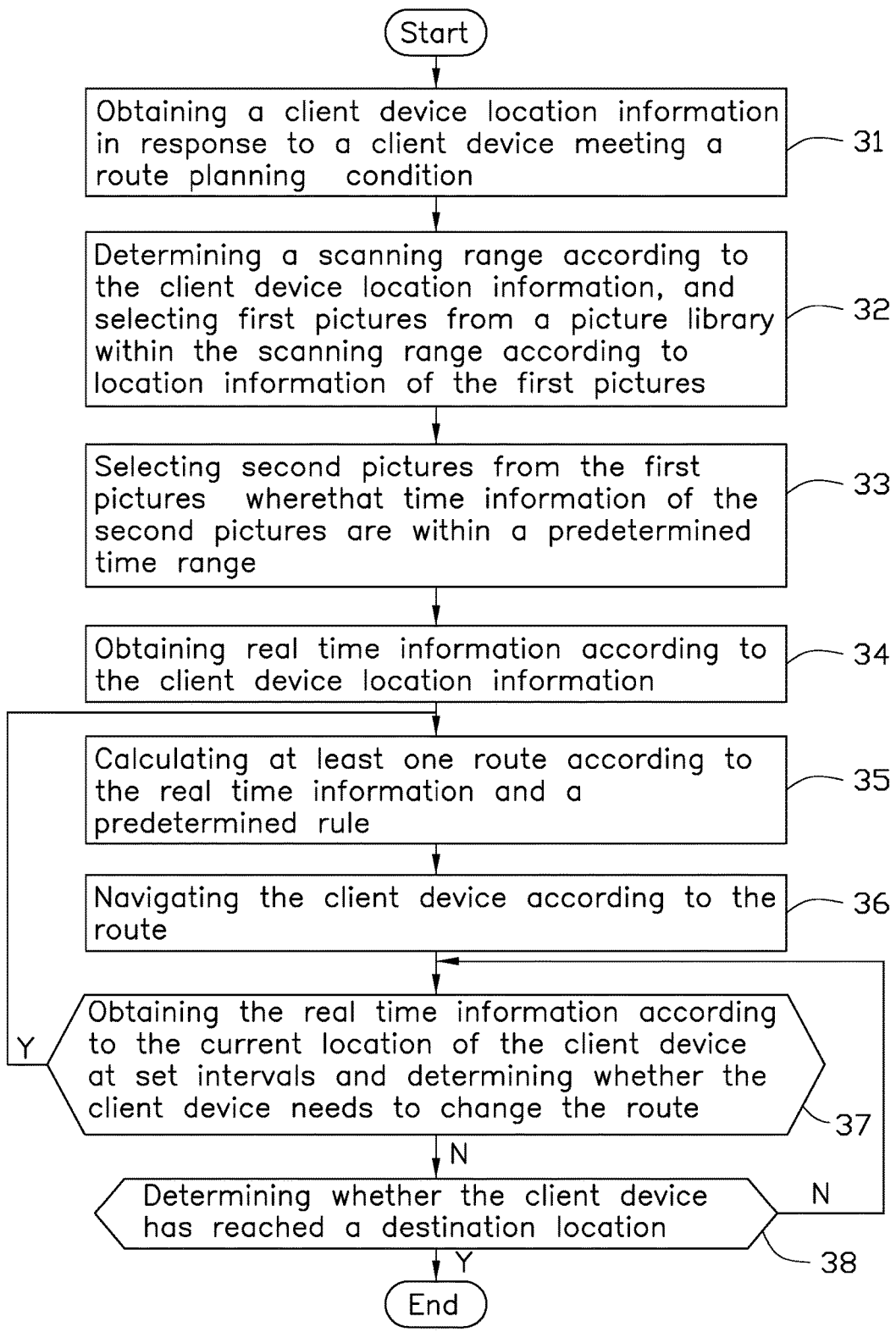
FIG. 3 is a flow diagram of an exemplary embodiment of a route planning method.

FIG. 3 illustrates an exemplary embodiment of a route planning system. The flowchart presents an example exemplary embodiment of the method. The example method is provided by way of example, as there are a variety of ways to carry out the method. The method described below can be carried out using the configurations illustrated in FIG. 2, for example, and various elements of these figures are referenced in explaining the example method. Each step shown in FIG. 3 represents one or more processes, methods, or subroutines, carried out in the example method. Furthermore, the illustrated order of steps is illustrative only and the order of the steps can change. Additional steps can be added or fewer steps may be utilized without departing from this disclosure. The example method can begin at step S31.

In step S31, the obtaining module 101 obtains the client device location information in response to the client device 2 meeting a route planning condition.

In one exemplary embodiment, the obtaining module 101 further obtains the client device location information and the client device moving direction through the position unit 25, in response to the client device 2 meeting the route planning condition.

In one exemplary embodiment, the route planning conditions can comprise a plurality of situations. For example, if a client device moving speed is greater than a predetermined speed (30 km/h for example), if the client device 2 is in a predetermined location (railway station or motor station for example), or if the server 1 or the client device 2 receives a route planning request, or if the current day falls on a weekend. Thus, when the moving speed of the client device 2 is greater than 30 km/h, the obtaining module 101 obtains the client device location information and the client device moving direction through the position unit 25.

When the obtaining module 101 is operated in the server 1, the server 1 needs to continuously obtain the client device location information from the client device 2. The server 1 calculates the client device moving direction and the client device moving speed according to the client device location information. The server 1 can obtain location information and time information of pictures from the picture library 14. The server 1 further can determine whether the client device 2 meets the route planning condition according to the client device location information, the client device moving direction, and the client device moving speed.

In one exemplary embodiment, the server 1 further receives a route planning request form the client device 2 and determines whether the route planning request meets the route planning condition. When the route planning request meets the route planning condition, the server 1 calculates and transmits a route to the client device 2.

When the obtaining module 101 is operated in the client device 2, the client device 2 obtains the client device location information through the position unit 25. The client device 2 calculates the client device moving direction and the client device moving speed according to the client device location information. The client device 2 can obtain location information and time information of pictures from the picture library 14. The client device 2 further can determine whether the client device 2 meets the route planning condition according to the client device location information, the client device moving direction, and the client device moving speed.

In one exemplary embodiment, the client device 2 further receives a route planning request by user input through the display unit 24 and determines whether the route planning request meets the route planning condition. When the route planning request meets the route planning condition, the client device 2 calculates and displays a route on the display unit 24.

In step S32, the selection module 102 determines the scanning range according to the client device location information, and select first pictures from the picture library 14 within the scanning range according to location information of the first pictures.

In one exemplary embodiment, the selection module 102 further determines the scanning range according to the client device location information and the client device moving direction.

Figure 4:
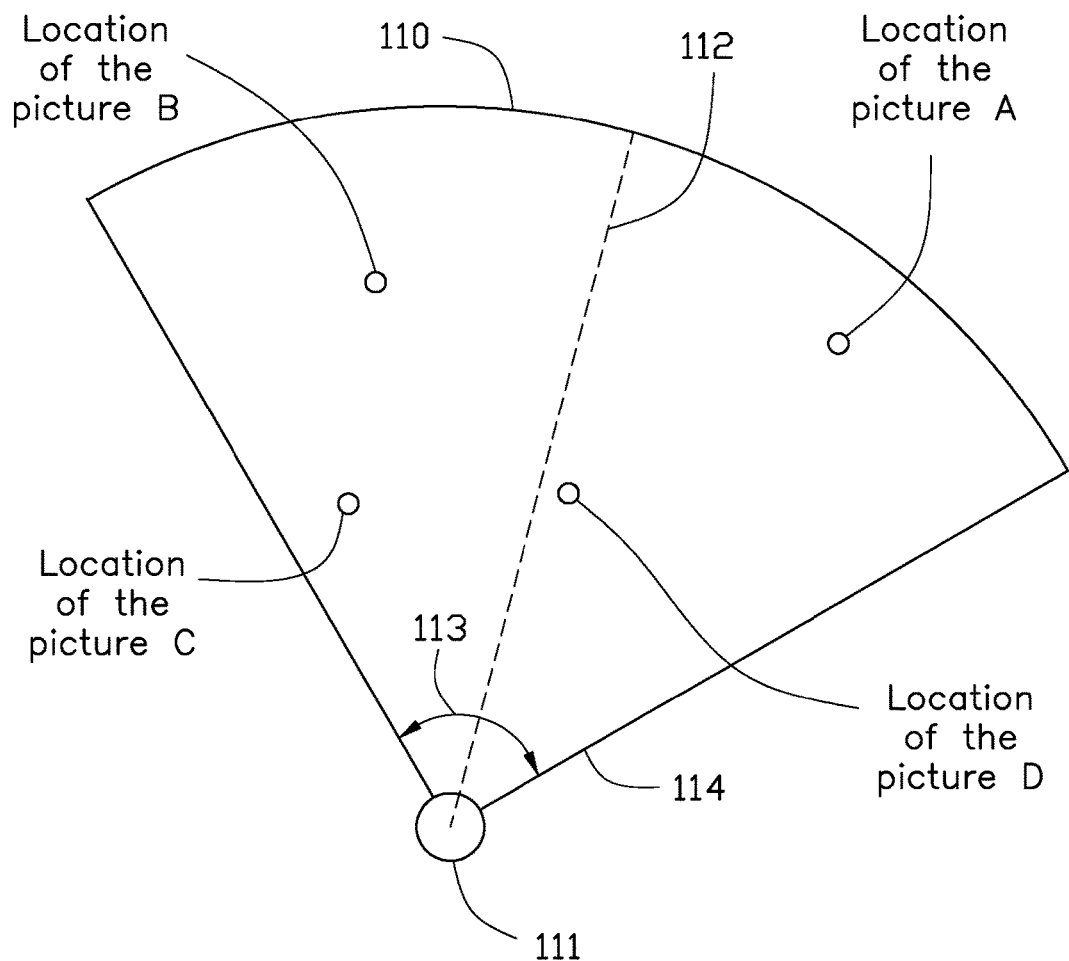
FIG. 4 is a diagram of an exemplary embodiment of a scanning range.

Referring to FIG. 4, the scanning range is a first sector area 110. A centre point 111 of the first sector area 110 can be a current location of the client device 2. An axis 112 of the first sector area 110 can be the client device moving direction, and the first sector area can be symmetrical with respect to the moving direction. A central angle 113 of the first sector area 110 can be a predetermined angle (90 degrees for example), and a radius 114 of the first sector area can be a predetermined distance (10 km for example).

In one exemplary embodiment, the selection module 102 further determines the scanning range according to the client device location information, the client device moving direction, and the client device moving speed. For example, the scanning range is a second sector area (not shown). A centre point of the second sector area can be the current location of the client device 2. An axis of the second sector area can be the client device moving direction. A central angle of the second sector area can be a predetermined angle (90 degrees for example), and a radius of the sector area can be the client device moving speed. When the client device moving speed is 100 km/h, the radius of the sector area is 100 km, the sector being symmetrical around the axis.

In one exemplary embodiment, the selection module 102 further receives a predetermined travel time from the client device 2, and determine the scanning range according to the client device location information, the client device moving direction, the client device moving speed, and a travel time of a tourist activity. For example, the selection module 102 sets the current location of the client device 2 as a centre point of a third sector area (not shown). An axis of the third sector area can be the client device moving direction. A central angle of the third sector area can be a predetermined angle (90 degrees for example), and a radius of the third sector area (symmetrical around the axis) can be a predetermined distance (10 km for example). The selection module 102 sets the third sector area as an initial scanning range and selects the first pictures from the picture library 14 relating to the third sector area. The selection module 102 calculates a travel time of each of the first pictures according to a current traffic situation, and determine whether the travel times of the first pictures are less than the predetermined travel time. When one or more travel times are greater than the predetermined travel time, the selection module 102 regulates the sweep of the central angle of the third sector area (from 90 degrees to 60 degrees for example) and/or the radius of the third sector area (from 10 km to 5 km for example) to bring the travel times of the first pictures to a level which is less than the predetermined travel time.

In one exemplary embodiment, the scanning range determined by the selection module 102 also can be a circular area (not shown). A centre point of the circular area can be the current location of the client device 2 and a radius of the circular area can be a predetermined distance (10 km for example).

In step S33, the selection module 102 selects second pictures from the first pictures where the time information of the second pictures are within a predetermined time range.

In one exemplary embodiment, the predetermined time range can be defined according to a plurality of conditions. For example, when a picture time information and a client device current time belongs to the same month or the same quarter, the time information of the picture can be deemed to be within the predetermined time range.

In one exemplary embodiment, the predetermined time range can further be a number of days. For example, the number of days is 15 days. When an interval between the picture time information and the client device current time is less than 15 days, the time information of the picture can be deemed to be within the predetermined time range.

In one exemplary embodiment, the selection module 102 can be executed by the server 1 or the application of the client device 2.

In step S34, the calculation module 103 obtains real time information according to the client device location information.

In one exemplary embodiment, the real time information can comprise the client device location information, the client device moving speed, the client device moving direction, and weather information of each tourist attraction.

In one exemplary embodiment, the real time information further comprises the number of visitors of each tourist attraction, and traffic information surrounding the client device 2.

In one exemplary embodiment, the calculation module 103 can obtain the number of visitors by communicating with a visitor counting system. The calculation module 103 also can obtain information as to the surrounding traffic of the client device 2 by communicating with a traffic information service system.

In step S35, the calculation module 103 calculates at least one route according to the real time information and a predetermined rule. A starting location of the least one route is the current location of the client device 2. The at least one route can be displayed on the display unit 24.

In one exemplary embodiment, the predetermined rule can be defined as the nearest tourist attraction from the client device 2, or a tourist attraction that has the minimal visitors, a specified tourist attraction, or a tourist attraction that has a longest/shortest travel time to visit.

In one exemplary embodiment, the calculation module 103 can calculate and select one route according to the predetermined rule. The calculation module 103 also can calculate a plurality of selectable routes according to multiple predetermined rules.

In one exemplary embodiment, the first sector area 110 can be determined according to the client device location information, the client device moving direction, the client device moving speed, and the travel time of each tourist attraction. Pictures A, B, C, and D are selected from the picture library 14. A journey time between two location points is calculated according to the client device location information and the traffic information. For example, a journey time from a location point of the client device 2 to a location point of the picture C is 35 minutes.

Figure 5:
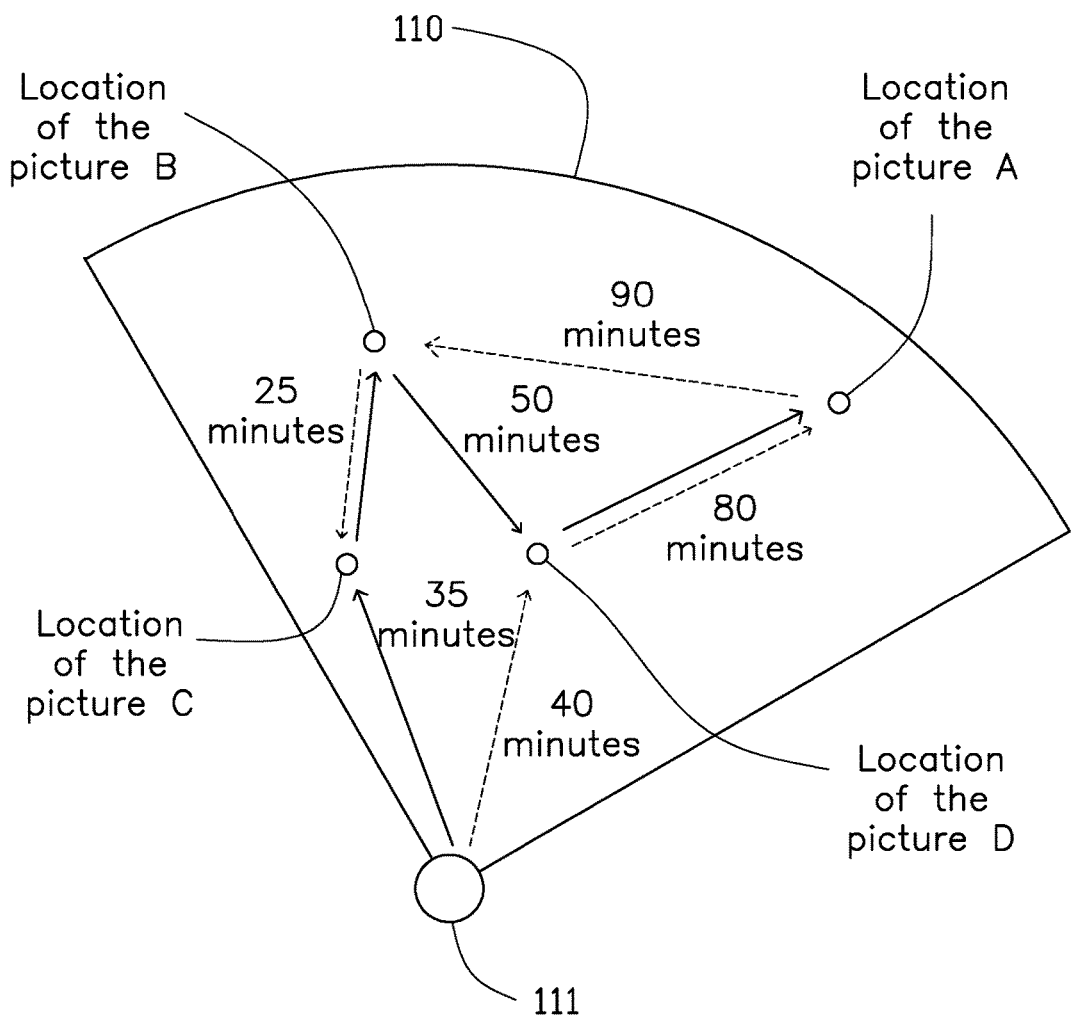
FIG. 5 is a diagram of an exemplary embodiment of a planning route of the scanning range in the FIG. 4.

In one exemplary embodiment, a first route 115 and a second route 116, as in FIG. 5, are calculated according to different rules. For example, the first route 115 is calculated according to the minimal visitors of the next tourist attraction. The second route 116 is calculated according to a specified order.

In one exemplary embodiment, the calculation module 103 can be executed by the server 1 or the application of the client device 2. When the calculation module 103 is executed by the server 1, the server 1 further transmits the calculated route to the client device 2.

In step S36, the navigation module 104 navigates the client device 2 according to the route calculated by the calculation module 103.

In one exemplary embodiment, the navigation module 104 can be executed by the client device 2. The navigation module 104 can control the display unit 24 to display a navigation route of a next tourist attraction and pictures of the tourist attraction which follows that.

In one exemplary embodiment, the navigation module 104 can control the display unit 24 to display a navigation route of the selected route and pictures of all the tourist attractions of the selected route. When the display unit 24 displays all the tourist attractions of the selected route, the user of the client device 2 can change a visiting sequence of the tourist attractions according to the display unit 24.

In step S37, the determination module 105 obtains the real time information according to the current location of the client device 2 at set intervals. The determination module 105 determines whether the client device 2 needs to change the route according to the client device location information and the real time information. When the client device 2 needs to change the route, the process turns to step S35. When the client device 2 does not need to change the route, the process turns to step S38.

In one exemplary embodiment, the determination module 105 obtains the real time information every 30 minutes for example. The determination module 105 recalculates a new route according to the real time information obtained by the determination module 105, and determines whether the new route is different from the route calculated by the calculation module 103. When the new route is different from the route calculated by the calculation module 103, the determination module 105 determines that the client device 2 needs to change the planning route.

In step S38, the determination module 105 determines whether the client device 2 has reached a destination location. Until the client device 2 reaches a destination location according to the planning route, the process remains in step S37.

In one exemplary embodiment, the determination module 105 determines whether all of the tourist attractions of the planning route have been visited. When all of the tourist attractions of the planning route have been visited, the determination module 105 determines that the client device 2 has finished the planning route.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A route planning system operating in a server, the server storing a plurality of pictures with location information and time information, the route planning system comprising:
    at least one storage unit, storing a plurality of modules, being a collection of instructions of an application operable in the system;
    at least one processor to execute the plurality of modules, the modules comprising:
    an obtaining module to obtain a client device location information when a moving speed of the client device is greater than a predetermined speed or when current day falls on a weekend; and
    a selection module to determine a scanning range according to the client device location information and to select first pictures from the server within the scanning range according to location information of the first pictures, and to select second pictures from the first pictures within a predetermined time range according to time information of the second pictures, wherein the predetermined time range is a time period that the time information of the second pictures and a current time of the client device belong to; and
    a calculation module to calculate a plurality of selectable routes according to the location information of the second pictures.

2. The route planning system of claim 1, wherein the modules further comprises:
    a transmission module to transmit the plurality of selectable routes calculated by the calculation module to the client device;
    wherein a starting location of the plurality of selectable routes is determined by the client device location information.

3. A route planning system operating in a client device, the client device comprising a position device and a storage device, the storage device storing a plurality of pictures with location information and time information, the route planning system comprising;
    an obtaining module to obtain a client device location information through the position device when a moving speed of the client device is greater than a predetermined speed or when current day falls on a weekend; and
    a selection module to determine a scanning range according to the client device location information and to select first pictures from the storage device within the scanning range according to location information of the first pictures, and to select second pictures from the first pictures within a predetermined time according to time information of the second pictures, wherein the predetermined time range is a time period that the time information of the second pictures and a current time of the client device belong to; and
    a calculation module to calculate a plurality of selectable routes according to the location information of the second pictures.

4. The route planning system of claim 3, further comprising:
    a display module to display the plurality of selectable routes;
    wherein a starting location of the plurality of selectable routes is determined by the client device location information.

5. The route planning system of claim 3, wherein the selection module further determines the scanning range according to the client device location information and a moving direction of the client device.

6. The route planning system of claim 5, wherein the scanning range is a sector area, an axis of the sector area is the moving direction of the client device, and the sector area is symmetrical with respect to the moving direction.

7. The route planning system of claim 3, wherein a centre point of the scanning range is a current location of the client device, and a radius of the scanning range is determined based on a moving speed of the client device.

8. The route planning system of claim 3, wherein the calculation module further:
    calculates a travel time of each of the first pictures;
    determines whether the travel time of each first picture is less than a predetermined travel time; and
    reduces the scanning range until the travel time of each first picture is less than the predetermined travel time when at least one travel time of the first pictures is greater than the predetermined travel time.

9. The route planning system of claim 3, wherein the selection module further:
    determines a selected route among the plurality of selectable routes, wherein the selected route comprises at least one tourist attraction;
    obtains real time information, wherein the real time information comprises weather information of each tourist attraction, a number of visitors of each tourist attraction, and traffic information surrounding the client device; and
    determines whether the selected route needs to change according to the client device location information and the real time information at set intervals.

10. A route planning method comprising:
    obtaining a client device location information when a moving speed of the client device is greater than a predetermined speed or when current day falls on a weekend;
    determining a scanning range according to the client device location information, and selecting first pictures from a plurality of pictures of a client device within the scanning range according to location information of the first pictures; and
    selecting second pictures from the first pictures within a predetermined time range according to time information of the second pictures, wherein the predetermined time range is a time period that the time information of the second pictures and a current time of the client device belong to; and
    calculating a plurality of selectable routes according to the location information of the second pictures.

11. The route planning method of claim 10, further comprising:

displaying the plurality of selectable routes in the client device;

wherein a starting location of the plurality of selectable routes is determined by the client device location information.

12. A route planning method comprising:

obtaining a client device location information when a moving speed of the client device is greater than a predetermined speed or when current day falls on a weekend;

determining a scanning range according to the client device location information, and selecting first pictures from a plurality of pictures of a server within the scanning range according to location information of the first pictures; and selecting second pictures from the first pictures within a predetermined time range according to time information of the second pictures, wherein the predetermined time range is a time period that the time information of the second pictures and a current time of the client device belong to; and calculating a plurality of selectable routes according to the location information of the second pictures;

wherein the server communicates with a client device through an internet.

13. The route planning method of claim 12, further comprising:

transmitting the plurality of selectable routes to the client device;

wherein a starting location of the plurality of selectable routes is determined by the client device location information.

* * * * *